United States Patent [19]

Petersen et al.

[11] Patent Number: 5,118,531
[45] Date of Patent: Jun. 2, 1992

[54] PUMPABILITY SEALANT COMPOSITION

[75] Inventors: Henno A. Petersen, Newtown; Jeffrey M. Lines, Washington, both of Conn.

[73] Assignee: Uniroyal Chemical Company, Inc., Middlebury, Conn.

[21] Appl. No.: 330,984

[22] Filed: Mar. 27, 1989

Related U.S. Application Data

[63] Continuation of Ser. No. 134,631, Dec. 18, 1987, abandoned, which is a continuation-in-part of Ser. No. 1,738, Jan. 16, 1987, abandoned.

[51] Int. Cl.⁵ ................................................ B05D 7/02
[52] U.S. Cl. ........................................ 427/230; 427/239; 427/245; 427/247; 427/287; 427/388.1
[58] Field of Search .............. 427/409, 398.1, 388.1, 427/407.1–412.5, 245, 287, 247, 230, 239

[56] References Cited

U.S. PATENT DOCUMENTS

| | | | |
|---|---|---|---|
| 3,670,555 | 6/1972 | Camelli et al. | 260/889 |
| 3,819,592 | 6/1974 | Visser et al. | |
| 3,941,909 | 3/1976 | Schoen | 427/412.3 |
| 3,946,099 | 3/1976 | MacKenzie | 427/120 |
| 4,088,713 | 5/1978 | Herman et al. | 260/897 |
| 4,101,512 | 7/1978 | Schmidt et al. | 427/212 |
| 4,133,796 | 1/1979 | Bullman | 427/208.2 |
| 4,170,664 | 10/1979 | Spenadel et al. | 427/44 |
| 4,301,119 | 11/1981 | Cobbs et al. | 222/146.1 |
| 4,505,957 | 3/1985 | Cobbs et al. | 427/385.5 |
| 4,522,957 | 6/1985 | Ashley | 427/222 |
| 4,527,712 | 7/1985 | Cobbs et al. | 239/124 |
| 4,546,046 | 10/1985 | Etzell et al. | 427/407 |
| 4,668,834 | 5/1987 | Rim et al. | 585/12 |
| 4,722,971 | 2/1988 | Datta et al. | 525/211 |
| 4,884,993 | 5/1975 | Gros | 260/897 |

*Primary Examiner*—Janyce Bell
*Attorney, Agent, or Firm*—Raymond D. Thompson

[57] ABSTRACT

A pumpable sealant composition comprises of (A) ethylene/propylene nonconjugated polyene terpolymer having a number average molecular weight of between about 4,000 and about 15,000; (B) ethylene/propylene copolymer having a number average molecular weight of between about 500 and about 5,000; (C) an effective amount of curative; (D) (optionally) filler; and (E) (optionally) a blowing agent; which composition possesses a Brookfield viscosity of between about 100,000 and about 5,000,000 centipoise at shear rates of 5 reciprocal seconds or greater at 22° C. Also disclosed is a method of protecting a substrate employing such composition.

3 Claims, No Drawings

PUMPABILITY SEALANT COMPOSITION

This is a continuation of application Ser. No. 134,631 filed Dec. 18, 1987 now abandoned and which is a continuation in part of application Ser. No. 001,738 filed Jan. 16, 1987 now abandoned.

FIELD OF THE INVENTION

The present invention is directed to a pumpable insulation and/or sealant composition comprised of (A) ethylene/propylene/nonconjugated polyene terpolymer having a number average molecular weight of between about 4,000 and about 15,000; (B) ethylene/propylene copolymer having a number average molecular weight of between about 500 and about 5,000; (C) an effective amount of curative; (D) (optionally) a blowing agent; and (E) (optionally) filler; which composition possesses a Brookfield viscosity of between about 100,000 and about 5,000,000 centipoise at shear rates of 5 reciprocal seconds or greater at 22° C. In another aspect, this invention relates to a method of protecting a substrate employing such pumpable composition.

BACKGROUND OF THE INVENTION

The use of low molecular weight ethylene/alphaolefin/nonconjugated diene terpolymers ("EPDM") as caulks and/or sealants has long been proposed by the art. Thus, U.S. Pat. No. 3,819,592 to Visser et al discloses a process for producing low molecular weight ethylene/propylene/(optionally) nonconjugated diene copolymers employing a vanadium salt/alkylaluminum halide catalyst and a molecular weight regulator which is a phosphorodithioate, a dithiocarbamate or a dithiocarbonate. This patent broadly discloses that curable liquid ethylene/alphaolefin/diene terpolymers can be utilized as adhesives, caulking compounds, sealants and plasticizing coagulants. However, Visser et al neither discloses nor suggests any formulations for so employing such low molecular weight terpolymers.

Despite its low molecular weight and "liquid" properties, lower molecular weight EPDM itself generally possesses too high a Brookfield viscosity at ambient temperatures and pumpable shear rates to be employed in pumpable formulations. Thus, for example, EPDM having a molecular weight of only about 7000 typically possesses a Brookfield viscosity of more than 6,000,000 centipoise at room temperature and pumpable shear rates. This viscosity dramatically increases even farther above the desired maximum pumpable Brookfield viscosity of about 5,000,000 centipoise upon the addition of fillers conventionally employed in compositions useful for insulation and/or sealant applications.

Accordingly, in order to lower the viscosity of the formulated composition to thereby produce a pumpable sealant or caulk it is customary to add either relatively large amounts of solvent or a plasticizer to such an EPDM sealant formulation. However, the use of large amounts of solvent is generally undesirable as such solvents will tend to run after the composition has been injected thereby adversely affecting the ability of the sealant compound to completely fill the recesses of the irregularly shaped volumes. In addition, the presence of high solvent levels will result in a high degree of shrinkage of the sealant composition and, provided a blowing agent is present, will tend to result in the production of an undesirable highly nonuniform cellular structure. Moreover, health and/or environment hazards are generally associated with the use of many conventional organic solvents.

Moreover, there are serious drawbacks associated with the use of conventional plasticizers which are generally low molecular weight hydrocarbons such as mineral oils or paraffinic oils. Not only will such conventional plasticizers adversely affect the tensile properties of the resultant cured composition, but the tendency of such oils to migrate from the rubber will greatly interfere with the ability of the compositions to adhere to the substrates (particularly materials such as galvanized metal surfaces) which the sealant is intended to protect.

Accordingly, it is an object of the present invention to provide a sealant, caulking and/or insulation composition which is readily pumpable into irregularly shaped voids.

It is a further object of this invention to provide a sealant, insulation caulking composition which will exhibit increased adhesion to oily galvanized metal surfaces, such as those typically encountered in the automotive industry.

It is yet another object of this invention to provide a process for insulating a substrate (e.g., from heat, air, water and/or sound) employing such a sealant and/or caulking composition.

The above objects and other additional objects will become more fully apparent from the following description and accompanying Examples.

DESCRIPTION OF THE INVENTION

In one aspect, this invention relates to a pumpable composition comprised of:

(A) ethylene/propylene/nonconjugated polyene terpolymer having a number average molecular weight of between about 4,000 and about 15,000;

(B) ethylene/propylene copolymer having a number average molecular weight of between about 500 and about 5,000;

(C) an effective amount of curative, (D) between 0 and about 10 parts by weight, based upon the total weight of components (A) and (B), of a blowing agent; and (E) between 0 and about 200 parts by weight, based upon the total weight of components (A) and (B), of a filler;

said sealant composition having a Brookfield viscosity of between about 100,000 and about 5,000,000 centipoise at shear rates of 5 reciprocal seconds or greater at 22° C.

In another aspect, this invention relates to a method for coating a substrate with a polymeric insulating layer, said method comprising the steps:

(I) pumping onto a substrate a pumpable composition comprised of:

(A) ethylene/propylene/nonconjugated polyene terpolymer having a number average molecular weight of between about 4,000 and about 15,000;

(B) ethylene/propylene copolymer having a number average molecular weight of between about 500 and about 5,000;

(C) an effective amount of curative;

(D) between 0 and about 10 parts by weight, based upon the total weight of components (A) and (B), of a blowing agent; and (E) between 0 and about 200 parts by weight, based upon the total weight of components (A) and (B), of a filler;

said sealant composition having a Brookfield viscosity of between about 100,000 and about 5,000,000 centipoise at shear rates of 5 reciprocal seconds or greater at 22° C.; and (II) subjecting such composition to curing conditions.

The low molecular weight ethylene/propylene/nonconjugated polyene terpolymers, component (A), (hereinafter referred to as "EPDM") which may be employed are polymers of ethylene, propylene and at least one copolymerizable nonconjugated polyene. Illustrative of the nonconjugated polyenes which may be employed are aliphatic dienes such as 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, exo- and endo-dicyclopentadiene and the like; exo- and endo-alkenylnorbornenes, such as 5-propenyl-, 5-(buten-2-yl)-, and 5-(2-methylbuten-[2']-yl)norbornene and the like; alkylalkenylnorbornenes, such as 5-methyl-6-propenylnorbornene and the like; alkylidenenorbornenes, such as 5-methylene-, 5-ethylidene-, and 5-isopropylidene-2-norbornene, vinylnorbornene, cyclohexenylnorbornene and the like; alkylnorbornadienes, such as methyl-, ethyl-, and propylnorbornadiene and the like; and cyclodienes such as 1,5-cyclooctadiene, 1,4-cyclooctadiene and the like. The preferred nonconjugated polyenes are 5-ethylidene-2-norbornene, 1,4-hexadiene and dicyclopentadiene.

The ethylene content of the ethylene/alphaolefin/-nonconjugated polyene terpolymers that may be employed is generally between about 25% and about 85%, is preferably between about 30% and about 75%, and is most preferably between about 40% and about 70%, all by weight. The polyene content of such terpolymers is generally below about 25%, and is preferably between about 2 and about 20%, all by weight.

In addition, the low molecular weight polymers employed in this invention may have incorporated therein and/or at the terminals thereof functional groups such as halogen, sulfenyl, sulfonyl, cyano, epoxy, hydroxy, carboxy, COOR, Si(OR)₃, Si(OOCR)₃ (R being a hydrocarbyl radical having 1–18 carbon atoms) and the like. Such functional groups may be introduced either by replacement, addition or graft polymerization reactions well known to those skilled in the polymerization art.

The EPDM polymers employed in the composition of this invention possess a number average molecular weight of between about 4,000 and about 15,000, preferably of between about 5,000 and about 10,000, and most preferably of between about 6,000 and about 9,000.

The ethylene/propylene copolymers (hereinafter referred to as "EP") employed as component (B) of the composition of this invention possess a number average molecular weight of between about 500 and about 5,000, preferably of between about 1,000 and about 4,000, most preferably of between about 1,500 and about 3,500. The ethylene to propylene weight ratio of such copolymers may vary between about 10:90 and about 90:10 and is preferably between about 70:30 and about 30:70.

Preferably, such EP polymers possess vinylidene-type terminal unsaturation, having one end having the formula:

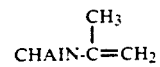

wherein CHAIN represents the polymer chain. These copolymers are readily prepared employing metallocene catalysts such as $(C_5H_5)_2Zr(CH_3)_2$, $(C_5H_5)_2Ti(CH_3)_2$, $(C_5H_5)_2ZrCl_2$, $(C_5H_5)_2TiCl_2$ and the like, in combination with linear or cyclic aluminoxane cocatalysts, such as methylaluminoxane. More detailed descriptions of processes for preparing these copolymers are present in U.S. Pat. No. 4,668,834, the disclosure of which is hereby incorporated by reference.

As is employed herein, the term "curative" encompasses both curatives and curing systems. As is well known to those skilled in the art, the particular curatives which may be employed in a given composition are generally governed by the availability of unsaturation and/or functional groups present in the polymers to be cured. A wide variety of curatives and curing systems may be employed where applicable, such as free radical generating agents such as organic aromatic and aliphatic peroxides, including, for example, aromatic diacyl peroxides and aliphatic diacyl peroxides, dibasic acid peroxides, ketone peroxides, alkyl peroxyesters and alkyl hydroperoxides. Specific nonlimiting examples of useful organic peroxides and hydroperoxides include diacetylperoxide, dibenzoylperoxides; bis-2,4-dichloro benzoyl peroxide; ditert.-butyl peroxide; dicumylperoxide: tert.-butylperbenzoate: tert.-butylcumyl peroxide; 2,5-bis-(tert.-butylperoxy)-2,5-dimethylhexane; 2,5-bis-(tert.-butylperoxy)-2,5-dimethylhexyne-3; 4,4,4',4'-tetra-(tert.-butylperoxy)-2,2-dicyclohexylpropane; 1,4-bis-(tert.-butylperoxy-isopropyl)-benzene: 1,1-bis-(tert.-butylperoxy)-3,3,5-trimethylcyclohexane; lauroyl peroxide; succinic acid peroxide, cyclohexanone peroxide; tert.-butyl peracetate and butyl hydroperoxide.

Also suitable in applicable cases are the azide curing agents including azidoformates, such as tetramethylenebis(azido-formate) and the like; aromatic polyazides, such as 4,4'-diphenylmethane diazide and the like; and sulfonazides such as p,p'-oxybis(benzene sulfonyl azide) and the like. Other curatives that may be used include the aldehydeamine reaction products such as formaldehyde-ammonia, formaldehyde-ethylchloride-ammonia, acetaldehyde-ammonia, formaldehyde-aniline, butyraldehyde-aniline, heptaldehyde-aniline, heptaldehyde-formaldehyde-aniline, hexamethylenetetramine, alphaethyl-beta-propylacrolein-aniline and the like; substituted ureas, such as trimethylthiourea, diethylthiourea, dibutylthiourea, tripentylthiourea, 1,3-bis(benzothiazolyl-mercaptomethyl)urea, N,N-diphenylthiourea and the like; guanidines, such as diphenylguanidine, di-o-tolylguanidine, diphenylguanidine phthalate, the di-o-tolylguanidine salt of dicatechol borate and the like: xanthates, such as zinc ethylxanthate, sodium isopropylxanthate, butylxanthic disulfide, potassium isopropylxanthate, and zinc butylxanthate and the like; dithiocarbamates, such as copper dimethyl-, zinc dimethyl-, tellurium diethyl-, cadmium dicyclohexyl-, lead dimethyl-, selenium dibutyl-, zinc pentamethylene-, zinc didecyl-, zinc isopropyloctyldithiocarbamate and the like; thiazoles, such as 2-mercaptobenzothiazole, zinc mercaptothiazolyl mercaptide, 2-benzothiazoyl-N,N-diethylthiocarbamyl sulfide, 2,2'-dithiobis(benzothiazole) and the like: imidazoles, such as 2-mercaptoimidazoline, 2-mercapto-4,4,6-trimethyldihydropyrimidine) and the like; sulfenamides such as N-tert-butyl-2-benzothiazole-, N-cyclohexylbenzothiazole-, N,N-diisopropyl-benzothiazole-, N-(2,6-dimethylmorpholino)-2-benzo-thiazolesulfenamide and the like; thiuramdisulfides, such as N,N'-diethyl-, tetrabutyl-, N,N'-diisopropyldioctyl-, tetramethyl-, N,N'-dicyclohexyl-, N,N'-tetralaurylthiuramidsulfide and the like; paraquinonedioxime, dibenzoparaquinonedioxime and the like; and sulfur itself. (See Encyclopedia of Chemical Technology, vol. 17, 2nd edition, Interscience Publishers, 1968; also Organic Peroxides, Daniel Swern, vol. 1, Wiley-Interscience, (1970)).

When a peroxide curative is employed, such curative may be used alone or with auxiliary substances such as sulfur; maleimides, including bis-maleimides; polyunsaturated compounds, such as cyanurate and the like; acrylic esters, such as trimethylolpropane trimethacrylate and the like; organic transition metal salts, such as cobalt octoate, cobalt naphthenate, copper stearate, chromium laurate and the like; and tertiary amines, such as tributylamine, and dimethyloctylamine and the like.

When using sulfur as a curative (whether in its elemental form or in the form of a sulfur donor, e.g., 4,4-dithiomorpholine), it is desirable to include an accelerator and an activator (e.g., a metal salt or oxide).

Mixed peroxide-type or mixed-sulfur-type curing systems may be employed. These include dicumylperoxide plus 2,5-bis-(tert.-butylperoxy)-2,5-dimethylhexane or sulfur plus tetramethylthiuramidisulfide plus dicumyl peroxide. See "Vulcanization and Vulcanizing Agents," W. Hoffman, Palmerton Publishing Co., New York, 1967, for an extensive disclosure of curing agents.

The curatives of the composition of this invention are present in an amount effective to cure the polymer of such composition. Typically, such curatives will be present in amounts of between about 0.5 and about 5 parts by weight per 100 parts of polymer (i.e., of EP plus EPDM).

In addition to the EPDM terpolymer, the EP copolymer, and the curing agent described above, the blends of this invention may further comprise blowing agents, fillers, antioxidants, ultraviolet stabilizers, cross-linking agents, pigments or colorants and the like, all of which additional components are well known to those skilled in the art.

Blowing agents suitable for use in the practice of this invention include inert compounds which readily turn from a liquid to a gaseous state upon heating to curing temperature range such as optionally halogenated (particularly fluorinated) hydrocarbons including pentane, hexane, octane; or solid chemical blowing agents which upon heating decompose thereby releasing gases such as $CO_2$, $N_2$ and the like. The latter blowing agents include sodium bicarbonate, azodicarbonamide, benzenesulfonyl hydrazide, toluenesulfonyl hydrazide, dinitrosopentamethylenetetramine, oxybis(p-benzenesulfonyl hydrazide) alone or in combination with activating agents therefor such as zinc oxide, metal salts of sulfinic acids such as zinc bistoluenesulfinic acid, potassium dodecane-sulfinic acid, activated urea, stearic acid, poly(ethylene ether)glycol and others. Such blowing agent is preferably present in amounts effective to provide a uniform cell structure, typically in amounts of between about 0.1 and about 10 parts by weight per 100 parts by weight of polymer (i.e., EP plus EPDM).

It is important to choose a blowing agent or blowing agent system whose gasification or decomposition temperature or temperature range is below that of or at least approximately equal to the activation temperature or temperature range of the curing agent(s) or curing system, thereby ensuring that excessive premature curing does not occur.

It is often advantageous to include fillers and/or reinforcing agents in the composition of this invention, such as carbon black, clay, pumice, talc, calcium carbonate, silica, silicates, barytes and metal oxides such as $TiO_2$. Typically, such fillers comprise between about 20 and about 200 parts by weight per 100 parts by weight of the total weight of EP and EPDM polymer. However, the amount of such fillers and/or additives employed should not be so high as to increase the viscosity of the composition as to render it nonpumpable.

For certain applications, it may be beneficial to add minor amounts of solvent to the compositions of this invention in order to increase their pumpability. Preferably less than 50 weight percent, more preferably less than 40 weight percent, most preferably less than 25 weight percent solvent, based on the total weight of the composition, is employed. Any compatible solvent may be used, the most common being aliphatic and aromatic hydrocarbons such as hexane, naphtha, toluene and xylene.

The ratio of EPDM terpolymer to EP copolymer employed in the compositions of this invention may vary greatly, depending upon factors such as the molecular weight of the polymers employed, the termonomer employed in the EPDM, and other similar factors. However, the weight ratio of EPDM:EP will generally range between about 90:10 and about 10:90, with ratios of between about 75:25 and about 25:75 being preferred for most applications.

The composition of this invention should possess a Brookfield viscosity of between about 100,000 and about 5,000,000 centipoise at shear rates of 5 reciprocal seconds or greater at 22° C. in order to be readily pumpable. Most preferably, these compositions will possess a Brookfield viscosity of between about 500,000 and about 3,000,000 centipoise at such shear rates and temperature.

It is preferred that a thorough dispersion of the components of this invention be achieved. However, because the compositions employed in the practice of this invention are generally viscous, high shear mixing may be necessary. This high shear mixing may be accomplished employing suitable mixers, such as homogenizers, dispersers and sigma blade mixers. Mixing may be done at room temperature or elevated (e.g., 30°-175° C.) temperature so long as such temperature is below the curing (and, if appropriate blowing) temperature of the composition.

Preferably, all the ingredients except the blowing agent (if employed) are first blended together until an essentially homogeneous composition is obtained, it being understood that the mixing temperature should not reach the activation temperature of the curative. Thereafter, the blowing agent may be blended in while taking care that the mixing temperature remains well under the decomposition or gasification temperature of the blowing agent.

The method of this invention is typically performed as follows. The composition of this invention is pumped onto the substrate to be insulated. The composition may be pumped by the conventional techniques, e.g., by compressed air, which generally involve pumping it at increased pressure through a nozzle.

The composition is then cured (and, if appropriate, foamed) by exposing it to appropriate conditions, typically increased temperature.

The compositions of this invention may be pumped onto any suitable substrate which can withstand curing temperatures and to which they can sufficiently adhere. Illustrative of such substrates are metals, such as aluminum, steel or chrome; carbon fibers; high softening point thermoplastics; and thermoset materials which maintain their dimensional integrity at curing temperatures; concrete, brick, wood, glass, sheet rock, fiberboard paneling (cellulosic or synthetic based), paper or paperboard. Also painted or coated metals, such as galvanized steel, automobile body panels with prime coat or paint, and the like may be protected in accordance with the process of this invention. Upon curing, the pumpable compositions of this invention exhibit an unexpected degrees of adherence to such substrates.

The compositions of this invention provide a versatility of application where sonic, waterproofing and/or thermal insulation is desired. Specific applications envisioned include seam sealing, crack and void filling, rust proofing, trunk lid seals, undercoating, and noise reducing layers. For the above and similar automotive applications, the compositions of this invention are especially suitable because curing (and if appropriate, foaming) may be achieved while simultaneously heat treating car body paint.

EXAMPLE

The following Example is provided to further illustrate the invention and is not intended to limit the scope of the invention in any manner.

In order to show the unexpectedly increased pumpability which is achieved employing blends of EPDM and EP relative to EPDM alone, several blends of EPDM and EP were prepared and their Brookfield Viscosities at room temperature (about 22° C.) measured. The EPDM employed comprised (about 10 weight percent) dicyclopentadine as the termonomer, had an ethylene to propylene ratio of 52:48, and possessed a molecular weight of about 6500. Compositions 1-3 employed an ethylene/propylene copolymer (E:P ratio of 65:35) which contained terminal vinylidene-type unsaturation and which possessed a molecular weight of 2870. Examples 4-6 comprised an ethylene/propylene copolymer (E:P ratio of 39:61) not containing such terminal unsaturation, which copolymers had a molecular weight of 2830.

Blends of the EPDM and the EP copolymer employed were prepared by mixing selected amounts of each polymer on a rotary propeller stirrer equipped with an electrical heating jacket for 15 minutes at 90° C. (propeller speed about 1000 RPM).

The Brookfield viscosities of each composition were measured at 22° C. employing a Brookfield Viscometer (model RVT) using a number 7 spindle. As a comparison (Composition A), the Brookfield viscosity of low molecular weight, liquid EPDM alone (identical to the EPDM employed in Examples 1-6) was similarly determined. The results of the testing of the blends prepared is summarized in Table I below.

TABLE I

| Composition | EPDM (parts) | Vinylidene terminated EP (parts) | Non-vinylidene terminated EP (parts) | Brookfield viscosity (centipoise) |
|---|---|---|---|---|
| 1 | 450 | 150 | — | 1,490,000 |
| 2 | 300 | 300 | — | 467,000 |
| 3 | 150 | 450 | — | 139,000 |
| 4 | 450 | — | 150 | 2,130,000 |
| 5 | 300 | — | 300 | 1,090,000 |
| 6 | 150 | — | 450 | 474,000 |
| A | 600 | — | — | 5,200,000 |

It is seen that the Brookfield viscosity of the EPDM alone is about 5,200,000 centipoise—i.e., a figure too high to be readily pumpable. In contrast, the compositions of this invention exhibit much lower Brookfield viscosities and are thus much more amenable to application by pumping.

What is claimed is:

1. A method of insulating a plurality of automotive body panels which are subjected to a heat treatment for the body paint, said method comprising the steps of:
    pumping at ambient temperature, a highly viscous, pumpable curable sealant composition onto said plurality of automotive body panels to form an uncured insulated composite, said highly viscous, pumpable curable sealant composition having a Brookfield viscosity of between about 100,000 and about 5,000,000 centipoise at shear rates of 5 reciprocal seconds or greater at 22° C. and being composed of
    (a) a curable ethylene/propylene nonconjugated polyene terpolymer having a number average molecular weight of between about 5,000 and about 15,000
    (b) an ethylene/propylene copolymer having a number average molecular weight of between about 500 and 5,000 having vinylidene-type terminal unsaturation on at least one end of each chain having the formula $_3HC-C=CH_2$, (c) about 0.5 to about 5.0 parts by weight of curative reactive with unsaturation present in said curable ethylene/propylene nonconjugated polyene terpolymer, (d) between 0 and about 200 parts by weight, based upon the total weight of components (a) and (b), of a blowing agent, and (e) between 0 and about 200 parts by weight, based upon the total weight of components (a) and (b), of a filler;
    heating said uncured insulated composite at temperatures high enough to activate said curative; and
    curing and adhering said sealant composition to said plurality of rigid panels, to form a cured sealant composition.

2. A method according to claim 1 further comprising the step of simultaneously curing and foaming said sealant composition by heat actuation of said blowing agent during said heating step said blowing agent being present at about 0.1 to about 10 parts by weight.

3. A method according to claim 2 wherein said pumping step is conducted by directing said pumpable sealant into a plurality of irregularly shaped voids in said automotive body panels and wherein said foaming and curing steps effect a substantial filling of said voids by said cured sealant composition.

* * * * *